United States Patent
Chen et al.

(10) Patent No.: US 9,519,458 B1
(45) Date of Patent: Dec. 13, 2016

(54) OPTIMIZED FUSED-MULTIPLY-ADD METHOD AND SYSTEM

(71) Applicant: Cadence Design Systems, Inc., San Jose, CA (US)

(72) Inventors: David H. C. Chen, Palo Alto, CA (US); William A. Huffman, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 269 days.

(21) Appl. No.: 14/248,130

(22) Filed: Apr. 8, 2014

(51) Int. Cl.
  *G06F 7/57* (2006.01)
  *G06F 7/483* (2006.01)

(52) U.S. Cl.
  CPC ....... *G06F 7/483* (2013.01); *G06F 2207/4835* (2013.01)

(58) Field of Classification Search
  None
  See application file for complete search history.

(56) References Cited

U.S. PATENT DOCUMENTS

| | | | | |
|---|---|---|---|---|
| 5,517,438 A * | 5/1996 | Dao-Trong | ............ | G06F 7/5443 708/501 |
| 5,999,960 A * | 12/1999 | Gerwig | ............ | G06F 5/01 708/500 |
| 6,381,624 B1 * | 4/2002 | Colon-Bonet | ........ | G06F 7/5443 708/501 |
| 7,451,172 B2 * | 11/2008 | Powell, Jr. | ............ | G06F 7/483 708/501 |
| 8,577,948 B2 * | 11/2013 | Srinivasan | ............ | G06F 9/3001 708/501 |
| 8,626,813 B1 * | 1/2014 | Swartzlander | ........ | G06F 7/5443 708/501 |
| 2011/0231460 A1 * | 9/2011 | Ahmed | ............ | G06F 7/483 708/205 |

OTHER PUBLICATIONS

"IEEE Std 754-2008—IEEE Standard for Floating-Point Arithmetic," IEEE Press, 2008.
Gongqiong Li, et al., "Design of a Fully Pipelined Single-Precision Multiply-Add-Fused Unit," 20th International Conference on VLSI Design (VLSID '07), 2007, IEEE.

* cited by examiner

*Primary Examiner* — David H Malzahn
(74) *Attorney, Agent, or Firm* — Schwegman Lundberg & Woessner, P.A.

(57) ABSTRACT

A fused-multiply-add system is disclosed. The fused-multiply-add system includes a multiplier to multiply first and second operands and to provide at least one product. The fused-multiply-add system also includes an alignment shifter for aligning a third operand with the at least one product to provide an aligned third operand. The fused-multiply-add system also includes an adder and a subtractor coupled to the multiplier and the alignment shifter for performing two asymmetrical additions in parallel paths. The fused-multiply-add system also includes at least one leading zero counter for counting a number of leading zero bits provided by at least one of the adder and the subtractor to provide at least one normalization shift amount. Finally, the fused-multiply-add system includes a multiplexer coupled to the adder and the subtractor for providing an appropriate output based upon a sign bit.

20 Claims, 4 Drawing Sheets

OPTIMIZED FUSED-MULTIPLY-ADD METHOD AND SYSTEM

FIELD OF THE INVENTION

The present invention is related generally to processing system and more particularly to a fused-multiply-add (FMA) system utilized in such a processing system.

BACKGROUND

A fused-multiply-add (FMA) is a floating-point multiply-add operation performed in one step, with a single rounding. That is, where an unfused multiply-add would compute the product a*b, round it to N significant bits, add the result to c, and round back to N significant bits, a FMA would compute the entire sum a*b+c to its full precision before rounding the final result down to N significant bits. A fast FMA can speed up and improve the accuracy of many computations that involve the accumulation of products. The FMA can usually be relied on to give more accurate results. A useful benefit of including this instruction is that it allows an efficient software implementation of division (see division algorithm) and square root (see methods of computing square roots) operations, thus eliminating the need for dedicated hardware for those operations.

For many applications, such as radar or other applications, conventional FMA designs cannot meet low latency or low power requirements of modern applications. Accordingly, what is needed is a FMA which meets low latency and low power requirements. The FMA must be low cost, easy to implement and adaptable to existing environments. The present invention addresses such a need.

SUMMARY

A fused-multiply-add (FMA) system is disclosed. The FMA includes a multiplier to multiply first and second operands and to provide at least one product. The FMA system also includes an alignment shifter for aligning a third operand with the at least one product to provide an aligned third operand. The FMA system also includes an adder and a subtractor coupled to the multiplier and the alignment shifter for performing two asymmetrical additions in parallel paths. The FMA system also includes at least one leading zero counter for counting a number of leading zero bits provided by at least one of the adder and the subtractor to provide at least one normalization shift amount. Finally, the FMA system includes a multiplexer coupled to the adder and the subtractor for providing an appropriate output based upon a sign bit.

DETAILED DESCRIPTION

The present invention is related generally to processing system and more particularly to a fused-multiply-add (FMA) system utilized in such a processing system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Methods and systems for performing a fused-multiply-add operation are disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or system.

The medium may be an electronic, magnetic, optical, electromagnetic, infrared, semiconductor system (or apparatus or device), or a propagation medium. Examples of a computer-readable medium include a semiconductor or solid state latch, register, register file, memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

The methods described herein may also be implemented using any suitable instruction set or instruction set architecture (ISA). The devices described herein may be implemented using an operation, hardware, emulation/simulation software, or a combination thereof. One with ordinary skills in the art understands that described methods or devices are applicable to floating point number calculations, fixed point number calculations, or a combination thereof.

Figure 1:
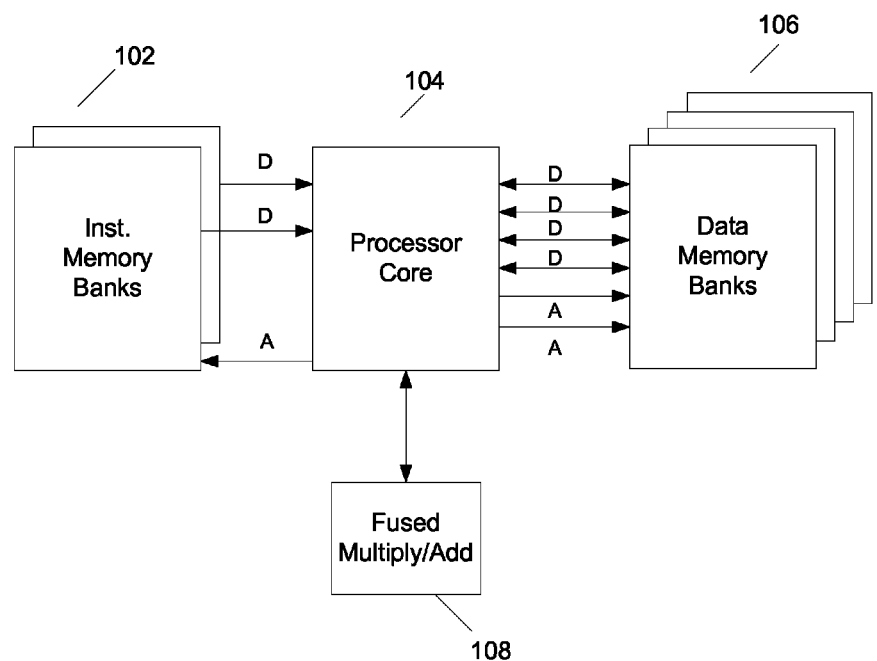
FIG. 1 is a block diagram of a processing system in accordance with the present invention.

FIG. 1 is a block diagram of a processing system 100 in accordance with the present invention. The processing system 100 includes a processor core 104 which may fetch instructions from a plurality of instruction memory banks 102 and may load or store operands from a plurality of data memory banks 106. The processor core 104 may exchange operands with a fused-multiply-add (FMA) system 108 as before mentioned. Although FMA designs are utilized in a variety of environments, the conventional FMA design may not meet the low latency requirements of high speed applications.

Figure 2:
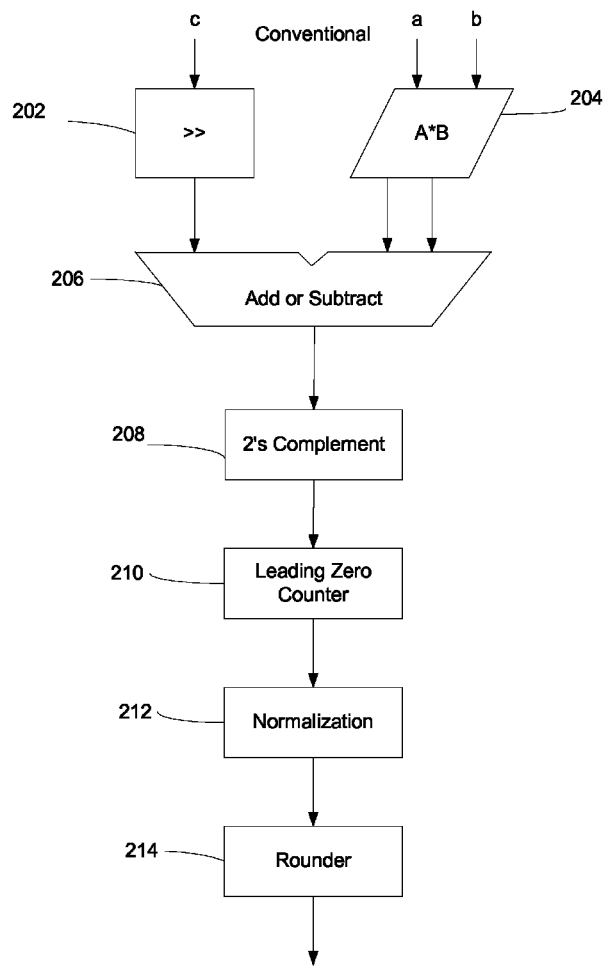
FIG. 2 is a block diagram of a conventional fused-multiply-add (FMA) system.

FIG. 2 is a block diagram of a conventional FMA system. A conventional FMA system comprises the following major elements as shown in FIG. 2. A multiplier 204 is utilized to generate a product of operands a*b (or 2 partial products). An alignment shifter 202 is to align operand c, based on an exponent of c and an exponent of a*b, and to generate an aligned operand c. An adder 206 is utilized to add or subtract the aligned operand c to or from the product of operands a*b (or the 2 partial products) from the multiplier 204 and the alignment shifter 202, and to generate a sum c+a*b (or −c+a*b).

A conditional complementor 208 is utilized to generate for example a 2's complement number of the sum when the sum is negative, based on the sum. A leading zero counter 210 is utilized to generate a leading zero count, based on how many leading bits of the 2's complement number are zeros. A normalization shifter 212 is utilized to left shift the 2's complement number based on the leading zero count, and to generate a normalized number with a one as a most significant bit (MSB) of the normalized number. A rounder 214 is utilized to round the normalized number based on a predetermined rounding mode, and to generate a rounded number according to for example IEEE-754 standard. This FMA design has long latencies because the operations have to be performed serially, and therefore the response time is slower.

Accordingly, by significant modifications to the above-identified elements and parallelizing modified elements, a system and method in accordance with the present invention reduces latency of a FMA system and speeds up the response time for high speed applications without increasing power, energy or area. To describe the features of the present invention in more detail refer now to the following description in conjunction with the accompanying Figures.

Figure 3:
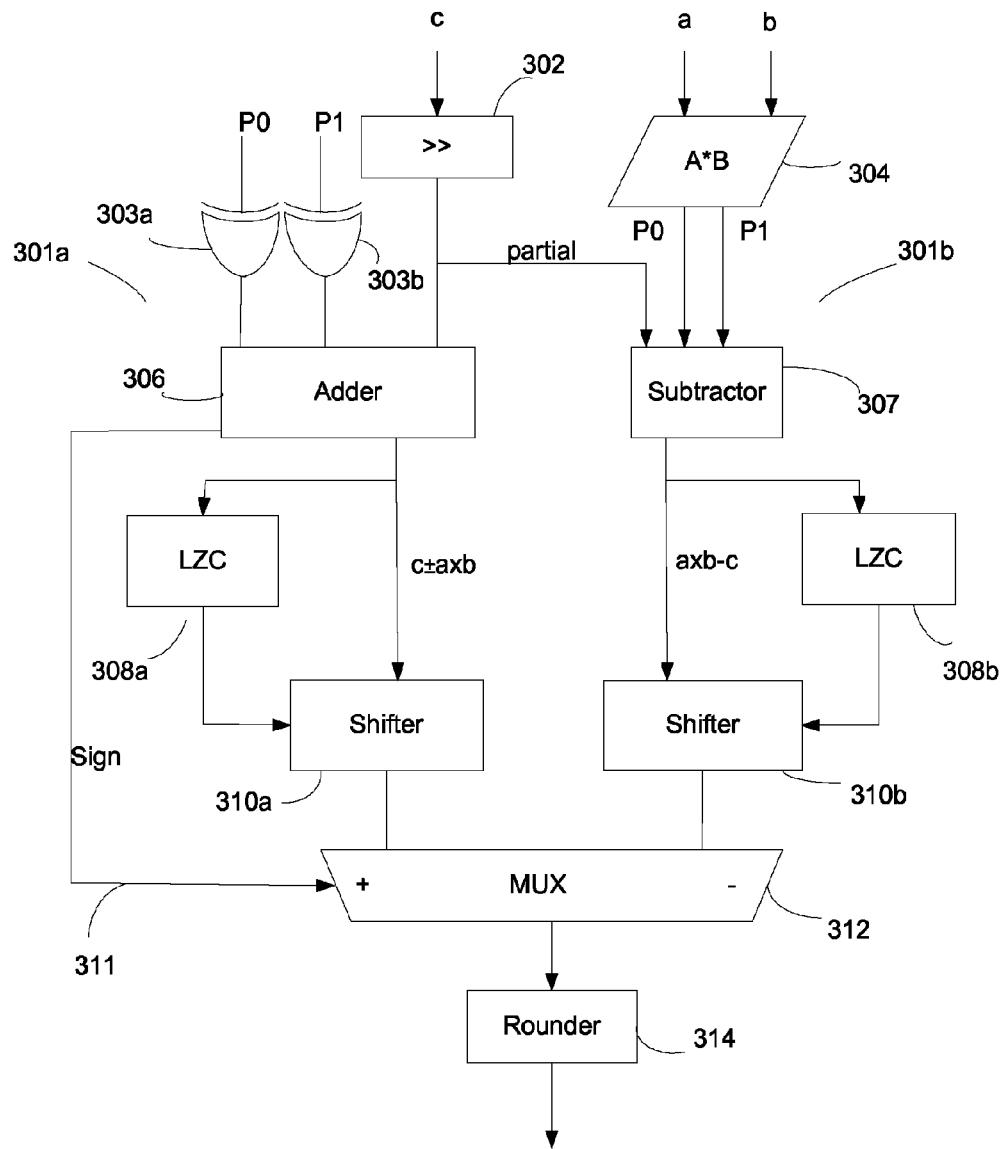
FIG. 3 shows a first embodiment of a FMA system accordance with the present invention.

FIG. 3 shows a first embodiment of a fused-multiply-add (FMA) system 300 in accordance with the present invention. Operands a and b are provided to a multiplier 304. Operand c is provided to an alignment shifter 302. There are two branches 301a and 301b of the FMA 300 that can operate in parallel. This parallel operation significantly lowers the latency of the operation of the FMA 300. To describe the advantages of this parallelism refer now to the following description.

In branch 301b [right side of FIG. 3], the partial products P0 and P1 of the multiplier 304 and a partial addend of the alignment shifter 302 are then provided to a subtractor 307. In an embodiment, the subtractor 307 comprises a carry save adder (CSA). In an embodiment the output of the subtractor is a*b-c. The output of the subtractor 307 is provided to a first leading zero counter (LZC) 308b and to a first shifter 310b. The output of LZC 308b is also provided to the shifter 310b. The LZC 308b counts a number of leading zero bits provided by the subtractor 307 to provide a first normalization shift amount. The output of the shifter 310b is then provided as a first input to a multiplexer 312. The partial addend is a segment of an aligned operand c, comprising bits which are equal or less significant than a most significant bit (MSB) of the partial products P0 and P1.

In branch 301a [left side of FIG. 3], the partial product P0 from the multiplier 304 is an input to a conditional inverter such as an exclusive or (XOR) gate 303a. The partial product P1 from the multiplier 304 is an input to a conditional inverter such as an exclusive or (XOR) gate 303b. The partial products P0 and P1 are conditionally inverted to provide a 2's complement number or a 1's complement number of the product a*b. The output of the alignment shifter 302 and the outputs of the XOR gates 303a and 303b are provided to an adder 306. In an embodiment, the adder 306 comprises a carry save adder (CSA). In an embodiment, the 1's complement number is used and a one (1) is used as a least significant bit (LSB) of a carry output of the CSA. In an embodiment the output of the adder 306 is c-a*b when the XOR gates 303a and 303b provide the 2's complement number or a 1's complement number of the product a*b, or is c+a*b when the XOR gates 303a and 303b provide the product a*b. In an embodiment, an output representing a sign is provided by the adder 306 to the multiplexer 312. In an embodiment the output representing a sign is provided by the subtractor 307. An output of the adder 306 which represents a difference c-a*b or a sum c+a*b is provided to a second LZC 308a and to a shifter 310a. An output of the LZC 308a is provided to the shifter 310a. The LZC 308a counts a number of leading zero bits provided by the adder 307 to provide a second normalization shift amount. An output of the shifter 310a is provided as a second input to the multiplexer 312. The multiplexer 312 is controlled by sign signal 311. Hence in this embodiment if the signal 311 represents negative the output of the shifter 301a should not be used but the output of the shifter 301b is correct. On the other hand if the signal 311 represents positive the output of shifter 301a is correct.

The multiplexer 312 selects a correct output value based on the signal 311. The correct output value is then provided to a rounder 314. In an embodiment, the rounder 314 may perform final addition and rounding in parallel or compound add/round. A final addition may be provided to add together a sum and a carry if the adder 306 is a carry save adder (CSA). In an embodiment, the rounder 314 may perform a final normalization shift to correct any error of the first or the second normalization shift amounts. The rounder 314 is utilized to round the correct output value based on a predetermined rounding mode, and to generate a rounded number according to for example IEEE-754 standard.

Figure 4:
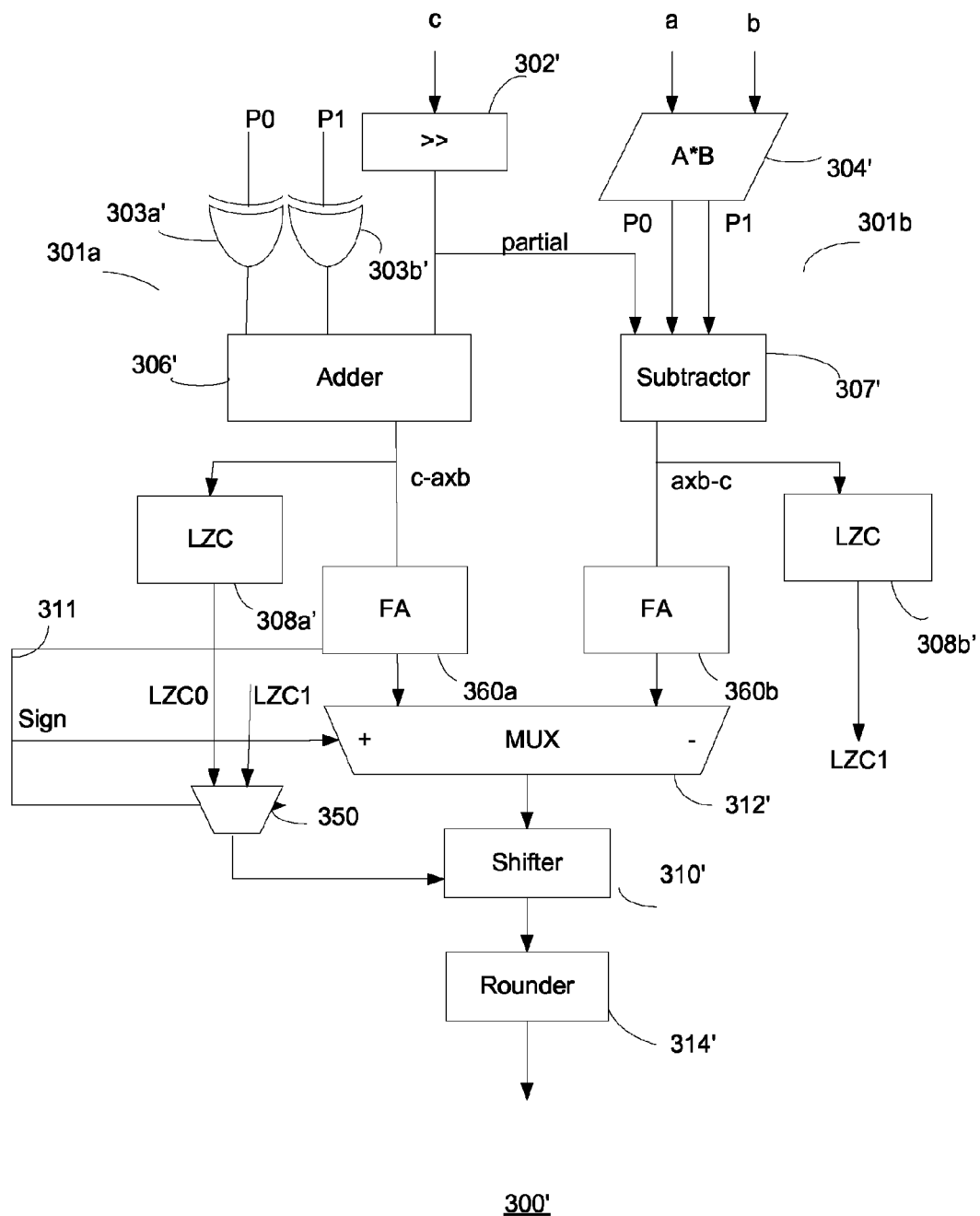
FIG. 4 is a second embodiment of a FMA system in accordance with the present invention.

FIG. 4 is a second embodiment of a FMA system 300' in accordance with the present invention. This operation has similar elements to those of FIG. 3 and operates in substantially the same manner. A key difference is that only one shifter 310' is utilized and it is between the multiplexer 312' and the rounder 314' and the shifter 310' is controlled by the outputs of LZCs 308a' and 308b' and the sign bit 311' via a second multiplexer 350. In the second embodiment, the sign bit 311' controls the multiplexers 312' and 350, and choose between branches 301a and 301b. Another key difference is a possibility of performing final additions earlier with full adders (FA) and the sign bit 311' generation. In an embodiment, there is a first full adder (FA) 360b in between a subtractor 307' and the multiplexer 312', and there is a second FA 360a in between an adder 306' and the multiplexer 312'. The first and second FA 360b and 360a receive outputs from the subtractor 307' and the adder 306' respectively. In an embodiment, the first and second FA 360b and 360a perform final additions by adding together respective sums and respective carries from the subtractor 307' and the adder 306', and provide outputs to the multiplexer 312'. In an embodiment, the first and second FA 360b and 360a generate the sign bit 311 to control the multiplexer 312' and the multiplexer 350. The rounder 314' performs simple rounding based on an output from the final additions, after which is selected by the multiplexer 312' and is normalized by the shifter 310'. In an embodiment, the rounder 314' may perform final normalization shifting to correct any error of the first and the second normalization shift amounts.

An FMA which operates in accordance with either of the embodiments shown in FIGS. 3 and 4 have a lower latency than a conventional FMA for a variety of reasons. A key feature of an embodiment in accordance with the invention is that the adder and the subtractor perform two asymmetrical additions in parallel paths which lower the latency of the FMA. The two asymmetrical and parallel paths eliminate a need for the conditional complementor 208 utilized in a conventional FMA 200, and reduce latency. Another advantage is the utilization of the subtractor 307 with only partial addend minimizes the size of the subtractor, and reduces power and energy consumptions. In so doing, latency and power/energy consumptions are lowered, and performance is improved. As a result, an FMA in accordance with an embodiment can operate at higher frequencies for various applications, without consuming more power or energy.

Throughout this description, "leading zero counter" (LZC) is a generic term which can be any system, apparatus or device capable of anticipating, counting, detecting or predicting how many leading bits are zero (0) before a first one (1). A leading zero counter can count a number of leading zero bits, with or without an error. When such an error may occur, the rounders 314 or 314' may perform a final normalization shift to correct the error. A leading zero counter can be a leading zero anticipator (LZA) which anticipates a bit location of the first one (1) and therefore may be called "leading one anticipator" or "leading one anticipation logic". Likewise, a leading zero detector (LZD) may be called "leading one detector", and a leading zero predictor (LZP) may be called "leading one predictor". The present invention allows utilization of any type of leading zero counter. Current examples of leading zero counter include a leading zero/one anticipator, a leading zero counter, a leading zero/one detector, or a leading zero/one predictor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A fused-multiply-add (FMA) system comprising:
    a multiplier multiplying a first operand and a second operand and providing at least one product of the first and second operands;
    an alignment shifter aligning a third operand with the at least one product and providing an aligned third operand;
    an adder and a subtractor coupled to the multiplier and the alignment shifter, the adder and the subtractor in parallel paths;
    at least one leading zero counter providing at least one normalization shift amount by counting a number of leading zero bits provided by at least one of the adder and the subtractor; and
    a multiplexer having a first multiplexer input coupled to an adder output of the adder and a second multiplexer input coupled to a subtractor output of the subtractor and, based upon a control signal input of the multiplexer, providing the first multiplexer input or the second multiplexer input as an output of the multiplexer.

2. The FMA system of claim 1, which includes a normalization shifter at the output of the multiplexer which shifts the output at the multiplexer based upon the at least one normalization shift amount.

3. The FMA system of claim 1, which includes at least one normalization shifter between at least one of the adder and the subtractor and at least one of the first multiplexer input and the second multiplexer input; wherein the at least one normalization shifter shifts at least one of an adder result at the adder output of the adder and a subtractor result at the subtractor output of the subtractor based upon the at least one normalization shift amount.

4. The FMA system of claim 1, wherein at least one of the adder and the subtractor comprises a carry-save adder (CSA).

5. The FMA system of claim 1, wherein at least one of the adder and the subtractor provides the control signal input of the multiplexer.

6. The FMA system of claim 1, which includes at least one full adder (FA) between at least one of the adder and the subtractor and at least one input of the multiplexer, and wherein the at least one FA performs any of additions of results from at least one of the adder and the subtractor and generating the control signal input of the multiplexer.

7. The FMA system of claim 1, wherein the at least one product comprises any of a product and a pair of partial products.

8. The FMA system of claim 1, wherein the adder adds the aligned third operand with the at least one product or with a complement number of the at least one product.

9. The FMA system of claim 1, wherein the subtractor subtracts a segment of the aligned third operand from the at least one product.

10. The FMA system of claim 9, wherein the segment of the aligned third operand comprises bits of the aligned third operand which are equal or less significant than a most significant bit (MSB) of the at least one product.

11. The FMA system of claim 1, wherein the leading zero counter comprises any of a leading zero/one anticipator (LZA), a leading zero counter (LZC), a leading zero/one detector (LZD), and a leading zero/one predictor (LZP).

12. A method for performing a fused multiply/add (FMA) operation comprising:
    multiplying a first operand and a second operand and providing at least one product of the first operand and the second operand;
    aligning a third operand with the at least one product to provide an aligned third operand;
    performing, using the at least one product and the aligned third operand, addition and subtraction in parallel paths utilizing an adder generating an adder result and a subtractor generating a subtractor result;
    counting a number of leading zero bits of at least one of the adder result and the subtractor result to provide at least one normalization shift amount; and
    selecting, as output of the fused multiply/add operation, between at least (i) a first result based on the adder result of the adder and (ii) a second result based on the subtractor result of the subtractor.

13. The method of claim 12, further comprising:
    shifting at least one of the adder result and the subtractor result based upon the at least one normalization shift amount.

14. The method of claim 12, wherein at least one of the adder and the subtractor comprises a carry-save adder (CSA).

15. The method of claim 12, wherein the at least one product comprises any of a product and a pair of partial products.

16. The method of claim 12, wherein the adder adds the aligned third operand with the at least one product or with a complement number of the at least one product.

17. The method of claim 12, wherein the subtractor subtracts a segment of the aligned third operand from the at least one product.

18. The method of claim 17, wherein the segment comprises bits of the aligned third operand which are equal or less significant than a most significant bit (MSB) of the at least one product.

19. A non-transitory computer-readable storage medium embodying instructions that, when executed by one or more processors, cause the one or more processors to perform operations comprising:
- multiplying a first operand and a second operand and providing a plurality of partial products of the first operand and the second operand;
- aligning a third operand with the plurality of partial products to provide an aligned third operand;
- performing addition and subtraction in parallel paths utilizing an adder generating an adder result and a subtractor generating a subtractor result;
- counting a number of leading zero bits to provide at least one normalization shift amount of at least one of the adder result and the subtractor result; and
- selecting, as output of a fused multiply/add operation, between at least (i) a first result based on the adder result of the adder and (ii) a second result based on the subtractor result of the subtractor.

20. The non-transitory computer-readable storage medium of claim 19, wherein the selecting is based upon a control signal indicating whether the third operand is added or subtracted from a product of the first operand and the third operand.

* * * * *